United States Patent
Noro et al.

(10) Patent No.: US 8,182,064 B2
(45) Date of Patent: May 22, 2012

(54) WASTE LIQUID TREATMENT DEVICE AND LIQUID EJECTING APPARATUS

(75) Inventors: Hideo Noro, Minamiminowa-mura (JP); Toshio Kumagai, Shiojiri (JP); Shinichi Kamoshida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 486 days.

(21) Appl. No.: 12/416,205

(22) Filed: Apr. 1, 2009

(65) Prior Publication Data

US 2009/0251510 A1    Oct. 8, 2009

(30) Foreign Application Priority Data

Apr. 2, 2008 (JP) ................................. 2008-096545

(51) Int. Cl.
*B41J 2/165* (2006.01)
*A62D 3/176* (2007.01)

(52) U.S. Cl. ......................................... 347/36; 588/309

(58) Field of Classification Search ................... 347/36; 588/309
See application file for complete search history.

(56) References Cited

U.S. PATENT DOCUMENTS

| | | | | |
|---|---|---|---|---|
| 5,173,269 A * | 12/1992 | Mon et al. | ................... | 422/186.3 |
| 2002/0153500 A1 * | 10/2002 | Fordahl et al. | ........... | 250/559.29 |
| 2002/0195748 A1 * | 12/2002 | Farnworth | ..................... | 264/401 |
| 2003/0063138 A1 * | 4/2003 | Varnon et al. | .................... | 347/36 |
| 2009/0189947 A1 * | 7/2009 | Noro et al. | ...................... | 347/36 |
| 2009/0196803 A1 * | 8/2009 | Kumagai | ..................... | 422/186.3 |
| 2010/0249486 A1 * | 9/2010 | Bar Nathan et al. | ........ | 422/186.3 |

FOREIGN PATENT DOCUMENTS

| | | |
|---|---|---|
| JP | 2004-155047 | 6/2004 |
| JP | 2007125713 A * | 5/2007 |
| JP | 2007230007 A * | 9/2007 |

OTHER PUBLICATIONS

Machine generated English translation of Japanese patent document JP 2007-125713 A to Aoki, Tetsushi, "Inkjet Recording Apparatus." Translation generated via http://www.ipdl.inpit.go.jp/homepg_e.ipdl on Aug. 3, 2011; 16 pp.*

* cited by examiner

*Primary Examiner* — Shelby Fidler
(74) *Attorney, Agent, or Firm* — Workman Nydegger

(57) ABSTRACT

A waste liquid treatment device includes a storage unit configured to store waste liquid which is cured upon reception of an ultraviolet ray and an irradiating unit configured to irradiate a liquid surface of the waste liquid in the storage unit in an uncured state with an ultraviolet ray, and the irradiating unit performs a spot irradiation of the ultraviolet ray so that the surface area of the liquid surface which is irradiated with the ultraviolet ray is smaller than the surface area of the liquid surface.

5 Claims, 10 Drawing Sheets

WASTE LIQUID TREATMENT DEVICE AND LIQUID EJECTING APPARATUS

CROSS-REFERENCE TO RELATED APPLICATION

The entire disclosure of Japanese Patent Application No. 2008-096545, filed Apr. 2, 2008 is expressly incorporated by reference herein.

BACKGROUND

1. Technical Field

The present invention relates to a waste liquid treatment device configured to treat waste liquid cured upon reception of an ultraviolet ray, and a liquid ejecting apparatus having the waste liquid treatment device.

2. Related Art

A waste liquid treatment device having a storage unit configured to store waste liquid which is cured upon reception of an ultraviolet ray and an irradiating unit configured to irradiate the ultraviolet ray on a liquid surface of the waste liquid adequately in the storage unit in an uncured state is already known as a sub-assembly of a liquid ejecting apparatus such as an ink jet printer (for example, see JP-A-2004-155047).

Curing the waste liquid in the storage unit in the uncured state as quickly as possible is required for treating waste liquid in the above-described waste liquid treatment device. In other words, realization of the waste liquid treatment device which is able to cure the waste liquid by irradiating the waste liquid in the storage unit in the uncured state with an ultraviolet ray efficiently is demanded.

SUMMARY

An advantage of some aspect of the invention is to cure waste liquid in a storage unit efficiently.

According to an aspect of the invention, there is provided a waste liquid treatment device including a storage unit configured to store waste liquid which is cured upon reception of an ultraviolet ray and an irradiating unit configured to irradiate a liquid surface of the waste liquid in the storage unit in an uncured state with an ultraviolet ray, in which the irradiating unit performs a spot irradiation of the ultraviolet ray so that the surface area of the liquid surface which is irradiated with the ultraviolet ray is smaller than the surface area of the liquid surface.

In this configuration, irradiation of the waste liquid in the storage unit in the uncured state with the ultraviolet ray is enabled in comparison with a case where the entire liquid surface is irradiated with the ultraviolet ray and, consequently, more effective curing of the waste liquid is achieved.

Preferably, the irradiating unit performs a spot irradiation of the ultraviolet ray so that the ultraviolet ray converges to a position where the waste liquid is located in the storage unit. In this configuration, curing of the waste liquid located at a position where the ultraviolet ray converges is achieved quickly.

Preferably, the irradiating unit performs a spot irradiation of the ultraviolet ray so that the ultraviolet ray converges to a position corresponding to the liquid level. In this configuration, curing of the waste liquid located at a position where the ultraviolet ray converges is achieved further quickly.

Preferably, the storage unit is a storage tank, and the irradiating unit is positioned above the liquid level in the storage tank. In this configuration, the efficient curing of the waste liquid in the storage unit is achieved while downsizing the waste liquid treatment device.

According to another aspect of the invention, there is also provided (C) a liquid ejecting apparatus including (A) a nozzle configured to eject liquid which is cured upon reception of a ultraviolet ray onto a medium; (B3) a waste liquid treatment device having (B1) a storage unit configured to store the liquid ejected from the nozzle which does not adhere to the medium as waste liquid, and (B2) an irradiating unit configured to irradiate the liquid surface of the waste liquid in the storage unit in an uncured state with the ultraviolet ray, in which the irradiating unit performs a spot irradiation of the ultraviolet ray so that the surface area of the liquid surface which is irradiated with the ultraviolet ray is smaller than the surface area of the liquid surface. In this configuration, the liquid which does not adhere to the medium out of the liquid ejected from the nozzle is stored in the storage unit as waste liquid, and then the waste liquid is efficiently cured.

Preferably, the waste liquid treatment device includes a moving mechanism configured to move the irradiating unit upward and downward and a liquid level sensor configured to output a signal according to the liquid level, and includes a controller configured to control the moving mechanism according to the change of the signal outputted by the liquid level sensor and causes the moving mechanism to move the irradiating unit upward and downward in order to maintain the distance between the irradiating unit and the liquid level. In this configuration, even when the amount of the waste liquid in the storage unit is changed and hence the liquid level is changed, the distance between the irradiating unit and the liquid level is maintained, so that the portion of the liquid surface which is irradiated with the ultraviolet ray is not changed. Accordingly, the waste liquid in the storage unit is continuously and efficiently cured.

Other features of the invention will be apparent by descriptions in the specification and the attached drawings.

BRIEF DESCRIPTION OF THE DRAWINGS

The invention will be described with reference to the accompanying drawings wherein like numbers reference like elements.

FIG. 4 is a drawing of a nozzle surface 31a.

DESCRIPTION OF EXEMPLARY EMBODIMENTS

Configuration of Liquid Ejecting Apparatus of an Embodiment

In the embodiment, a color ink jet printer (hereinafter, referred to as a printer 10) will be described as an example of a liquid ejecting apparatus.
Basic Configuration of Printer 10

Figure 1:
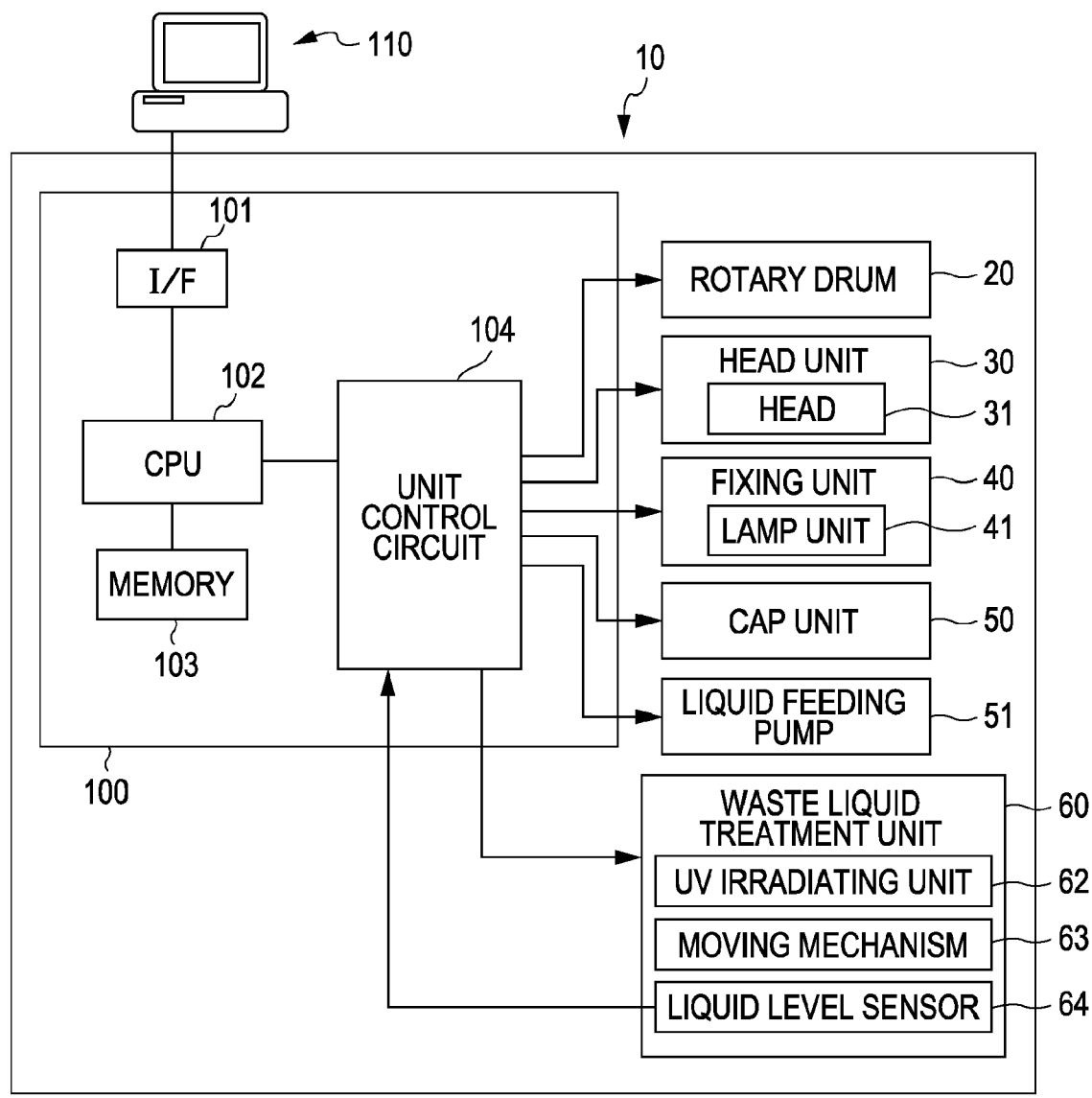
FIG. 1 is a block diagram showing a basic configuration of a printer 10.
Figure 2:
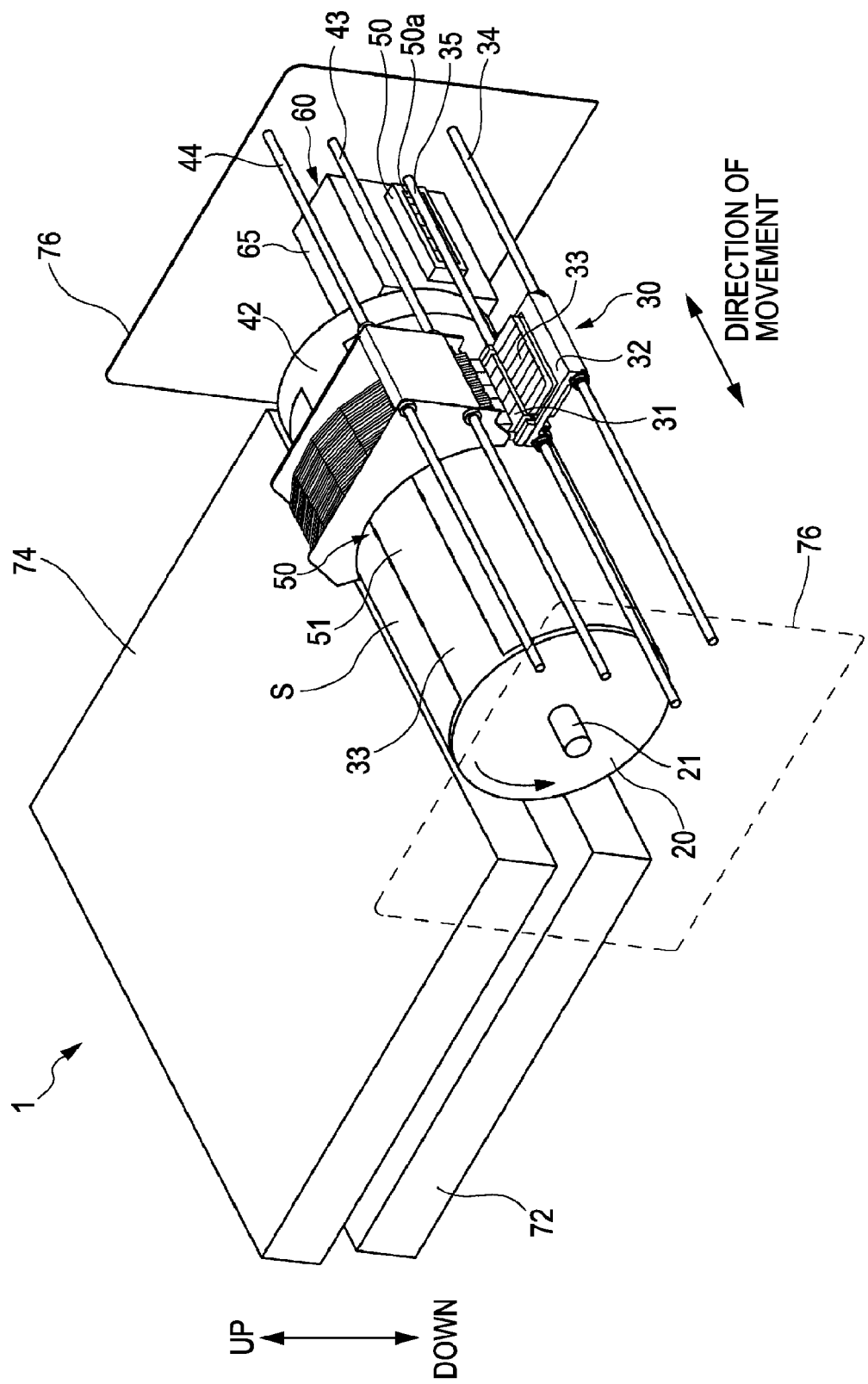
FIG. 2 is a drawing showing a general configuration of the printer 10.
Figure 3:
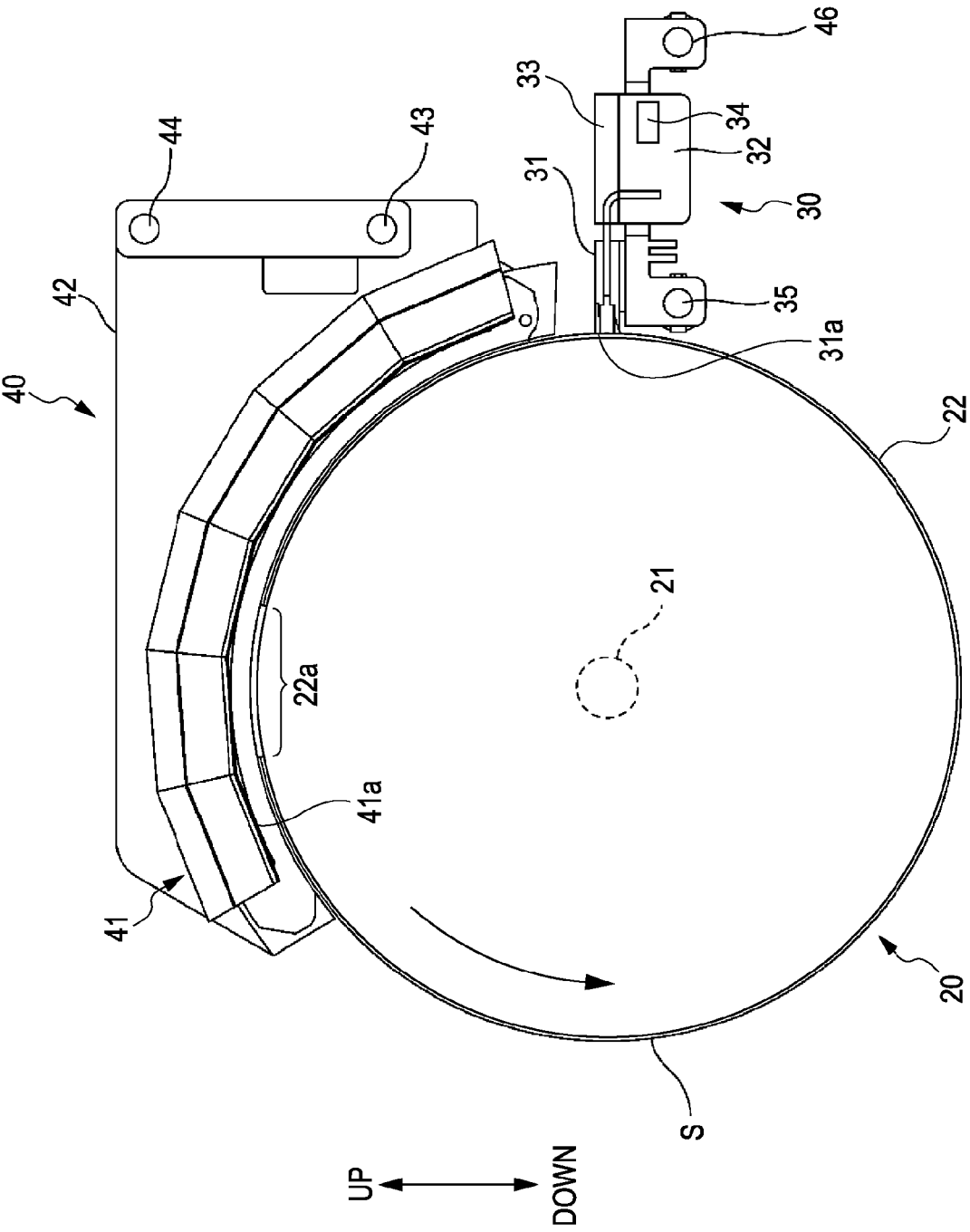
FIG. 3 is a schematic drawing showing a cross section of the general configuration of the printer 10.
Figure 4:
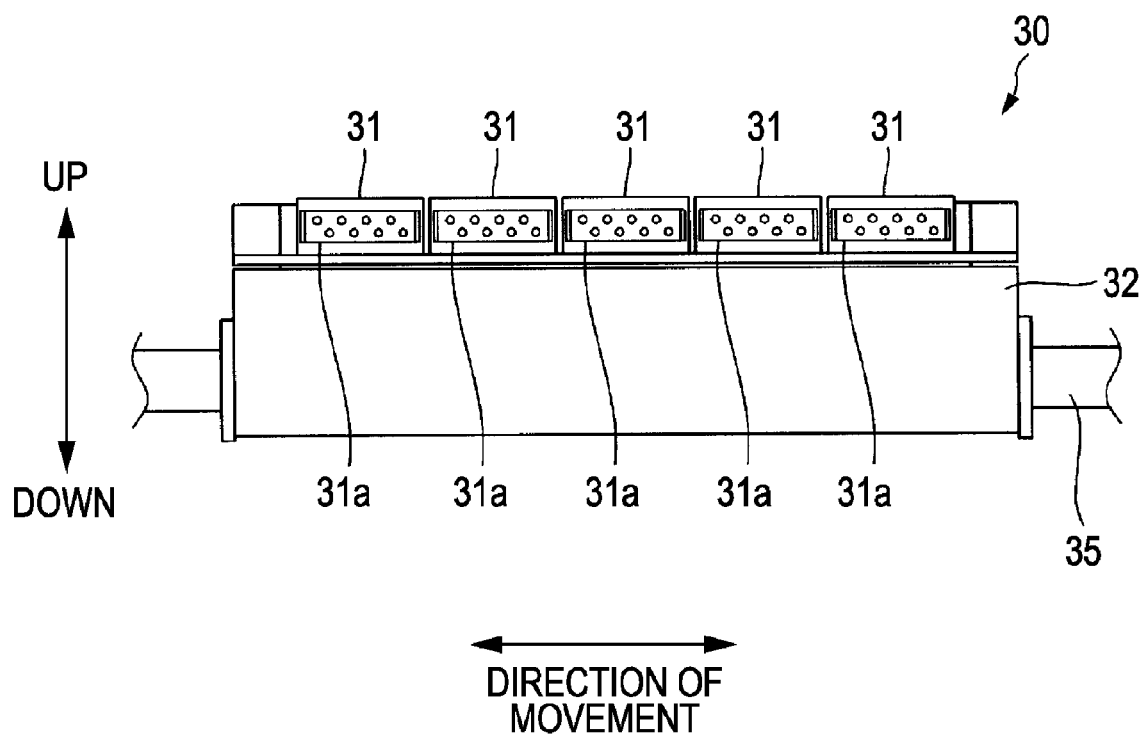

Referring now to FIGS. 1 to 4, the basic configuration of the printer 10 according to the embodiment will be described. FIG. 1 is a block diagram showing the basic configuration of the printer 10. FIG. 2 is a drawing schematically showing the entire configuration of the printer 10, in which the up and down directions of the printer 10 and the direction of movement of heads 31 (hereinafter, referred simply as "direction of movement") are shown by arrows. FIG. 3 is a schematic drawing showing a cross section (a cross section in which the direction of the normal line matches the axial direction of a revolving shaft 21 of a rotary drum 20) of an entire configuration of the printer 10, and the up and down directions of the printer 10 are shown by an arrow in the drawing. FIG. 4 is a drawing showing nozzle surfaces 31a, in which the up and down directions of the printer 10 and the direction of movement are shown by arrows.

The printer 10 is an apparatus configured to print an image on a medium S such as sheets or films by receiving print data from a host computer 110 and ejecting UV-cured ink (hereinafter, referred to as "UV ink") on the medium S on the basis of the print data. The printer 10 in the embodiment prints a color image on the medium S using the UV ink in five colors. The UV ink is an example of liquid to be cured upon reception of an ultraviolet ray, and is ink prepared by adding additives such as antifoaming agent to mixture of carrying liquid including UV-cured resin, photo polymerization starting agent, and pigment. When the UV ink receives the ultraviolet ray, a reaction of photo polymerization occurs in the UV-cured resin. Accordingly, the UV ink is cured.

As shown in FIG. 1, the printer 10 includes the rotary drum 20, the head unit 30, a fixing unit 40, a cap unit 50, a waste liquid treatment unit 60 as a liquid discharging apparatus, and a controller 100.

The rotary drum 20 is a holding member configured to hold the medium S on a peripheral surface 22 thereof, and rotates about the revolving shaft 21. As shown in FIG. 2, the rotary drum 20 is supported between a pair of frames 76 standing upright and opposing to each other, and rotates in a predetermined direction (the direction indicated by an arrow in FIG. 2) about the placing recess 21 when a drive motor, not shown is activated. As shown in FIG. 3, portion of the peripheral surface 22 of the rotary drum 20 is an area which does not hold the medium S (hereinafter, referred to as a "non-holding area 22a").

The head unit 30 is a member configured to print an image on the medium S and, as shown in FIG. 2, includes heads 31 for the respective ink colors, a head carriage 32, and ink cartridges 33. As shown in FIG. 4, the heads 31 each include a plurality of nozzles on the nozzle surfaces 31a opposing the peripheral surface 22 of the rotary drum 20. The nozzles eject UV ink supplied from the ink cartridges 33 on the medium S held on the rotary drum 20. In the embodiment, a pressure chamber and a piezoelectric element (both the pressure chamber and the piezoelectric element are not shown) are provided in each nozzle. Then, by compression and expansion of the pressure chamber by the operation of the piezoelectric element, the UV ink is ejected from the nozzle in drops. The head carriage 32 is supported by guide shafts 34 and 35 extending along the revolving shaft 21 of the rotary drum 20, and reciprocates along the guide shafts 34 and 35. Since the respective heads 31 are mounted on the head carriage 32, they reciprocate in association with the movement of the head carriage 32 along the guide shafts 34 and 35.

The fixing unit 40 is a member configured to irradiate the UV ink drops dropped on the medium S (that is, the UV ink adheres to the medium S) with the ultraviolet ray and fix dot lines formed of a plurality of the UV ink drops to the medium S. The fixing unit 40 is positioned on the downstream side of the head unit 30 in terms of the direction of rotation of the rotary drum 20. The fixing unit 40 includes lamp units 41 for the respective ink colors and a lamp unit carriage 42 as shown in FIG. 3. The respective lamp units 41 each have an irradiating surface 41a opposing the peripheral surface 22 of the rotary drum 20 along the direction of rotation of the rotary drum 20, and irradiate the peripheral surface 22 of the rotary drum 20 with the ultraviolet ray from the irradiating surfaces 41a. The lamp unit carriage 42 is supported by guide shafts 43 and 44 extending along the revolving shaft 21 of the rotary drum 20, and reciprocates along the guide shafts 43 and 44. Since the respective lamp units 41 are mounted on the lamp unit carriage 42, they reciprocate in association with the movement of the lamp unit carriage 42 along the guide shafts 43 and 44.

The cap unit 50 is a lid member configured to seal the nozzle surfaces 31a of the respective heads 31 and prevent the UV ink in the nozzles from drying when the UV ink is not ejected from the nozzles of the respective heads 31 toward the medium S (that is, when the printer 10 is in an idle state). As shown in FIG. 2, the cap unit 50 is positioned outside the peripheral surface 22 of the rotary drum 20 in the direction of movement. Therefore, the position where the cap unit 50 is located in the direction of movement corresponds to a waiting position of the heads 31.

The cap unit 50 also has a function to receive the UV ink ejected from the nozzles for flushing in the state of sealing the nozzle surfaces 31a. More specifically, the cap unit 50 has a recess 50a on the surface which seals the nozzle surfaces 31a (see FIG. 5, for example), and receives the UV ink ejected from the nozzles for flushing in the recess 50a. The flushing is an operation to forcedly cause the UV ink in the nozzles to be ejected for discharging the UV ink which is evaporatively drying and hence is increased in viscosity because of being situated near the openings of the nozzles, and is carried out for preventing the nozzles from being clogged. Since the UV ink ejected from the nozzles by flushing is not provided for printing images as a matter of course, it corresponds to the UV ink which does not adhere to the medium S.

The cap unit 50 is connected to a liquid feeding pump 51 (see FIG. 5, for example), and the UV ink that the cap unit 50 receives (that is, the UV ink ejected from the nozzles for flushing) is fed to the waste liquid treatment unit 60 by the liquid feeding pump 51. The waste liquid treatment unit 60 is a member configured to collect the UV ink fed from the liquid feeding pump 51 as waste liquid, and cure the UV ink as the waste liquid (hereinafter, also referred to simply as waste liquid). Then, the cured waste liquid is finally discarded from the printer 10. The waste liquid treatment unit 60 according to the embodiment is demountably mounted on the printer body (a portion of the printer 10 other than the waste liquid treatment unit 60). Principal devices of the waste liquid treatment unit 60 are stored in a casing 65, which will be described later in detail.

The controller 100 is a member configured to control the respective units described above included in the printer 10.

The states of the respective members in the printer 10 are monitored by various sensors, and the controller 100 controls the respective units of the printer 10 via a unit control circuit 104 by a CPU 102 on the basis of signals outputted from the respective sensors. The controller 100 includes a memory 103 configured to store print data sent from the host computer 110.

Waste Liquid Treatment Unit 60

Figure 5:
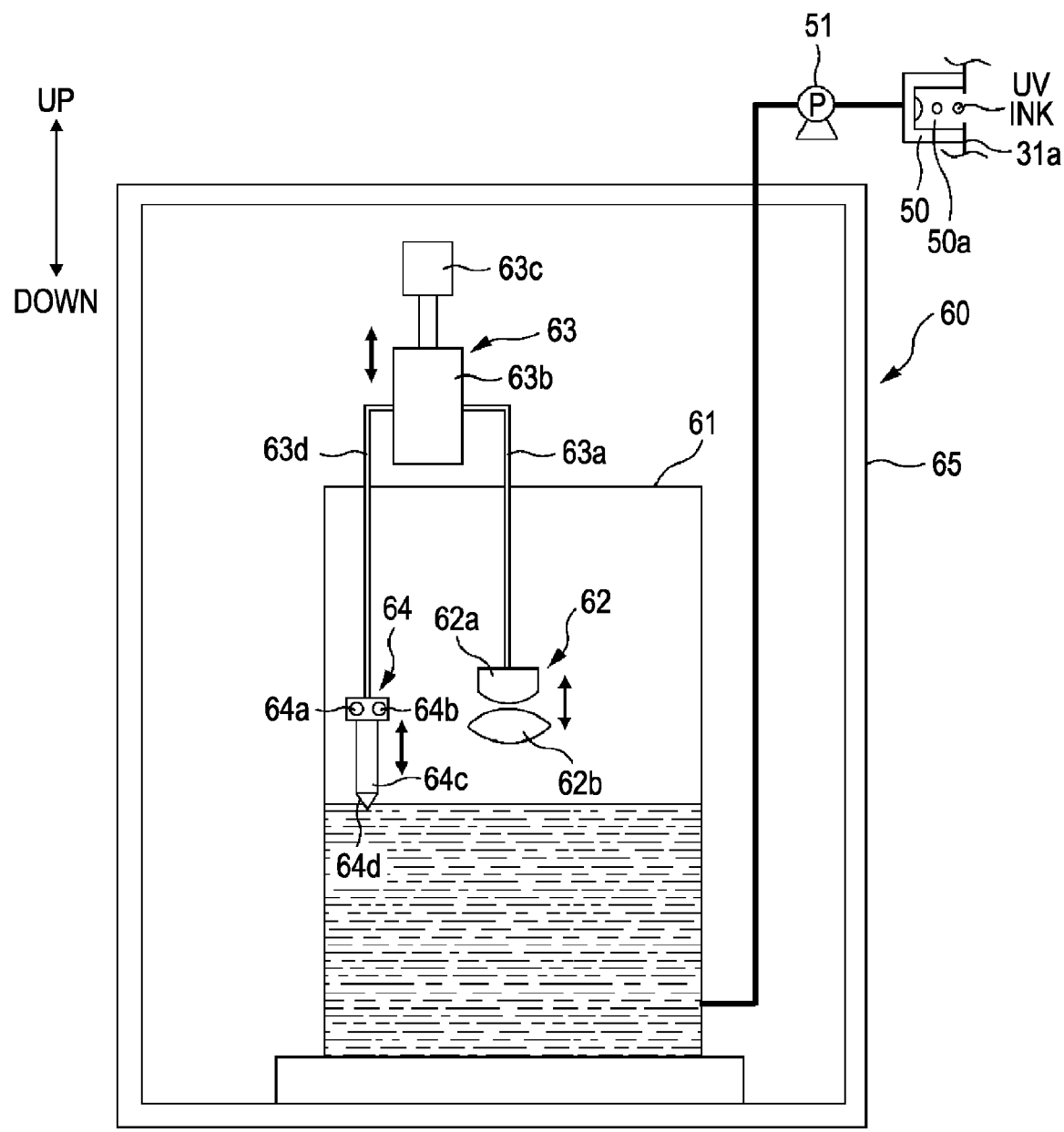
FIG. 5 is a conceptual drawing showing a waste liquid treatment unit 60 according to an embodiment of the invention.

Subsequently, referring now to FIG. 5, a configuration of the waste liquid treatment unit 60 will be described. FIG. 5 is a conceptual drawing showing the waste liquid treatment unit 60 in the embodiment, in which the up and down directions are indicated by an arrow in the drawing.

The waste liquid treatment unit 60 is a member configured to collect the waste liquid fed from the liquid feeding pump 51, and irradiate the waste liquid with the ultraviolet ray to cure the waste liquid as described above. The waste liquid treatment unit 60 includes a storage tank 61, a UV irradiating unit 62 as the irradiating unit, a moving mechanism 63, and a liquid level sensor 64 as shown in FIG. 5.

The storage tank 61 is connected to the liquid feeding pump 51 as shown in FIG. 5, and is a cylindrical tank configured to receive the waste liquid fed from the liquid feeding pump 51 and store the waste liquid in the interior thereof. In other words, the storage tank 61 corresponds to the storage unit configured to store the UV ink ejected from the nozzles for flushing as the waste liquid.

The UV irradiating unit 62 is a member configured to irradiate the liquid surface of the waste liquid in the storage tank 61 in the uncured state with the ultraviolet ray. The UV irradiating unit 62 is arranged in the storage tank 61, and is positioned above the position corresponding to the liquid level of the waste liquid in the storage tank 61 as shown in FIG. 5. Therefore, in the embodiment, the waste liquid treatment unit 60 is further downsized in comparison with a case where the UV irradiating unit 62 is arranged out of the storage tank 61.

The UV irradiating unit 62 includes a light source 62a of the ultraviolet ray and a lens 62b positioned downwardly of the light source 62a configured to convert the ultraviolet ray from the light source 62a (specifically, a convex lens) as shown in FIG. 5. The UV irradiating unit 62 focuses the ultraviolet ray on a focal point of the lens 62b when irradiating the liquid surface with the ultraviolet ray from the light source 62a. An UV-LED (Ultra Violet Light Emitting Diode) that emits the ultraviolet ray, a metal halide lamp, a xenon lamp, a carbon ark lamp, a chemical lamp, a low-pressure mercury lamp, or a high-pressure mercury lamp may be used as the light source 62a.

The moving mechanism 63 is a member configured to move the UV irradiating unit 62 upward and downward in the storage tank 61. The moving mechanism 63 includes a supporting member 63b configured to support the UV irradiating unit 62 via the first arm 63a and a step motor 63c configured to drive the supporting member 63b for moving the same upward and downward as shown in FIG. 5. In other words, the moving mechanism 63 in the embodiment is a member configured to move the UV irradiating unit 62 supported by the supporting member 63b upward and downward by moving the supporting member 63b upward and downward by the step motor 63c as shown in FIG. 5. The supporting member 63b by itself is supported by the guide shaft, not shown, so as to be movable upward and downward in the waste liquid treatment unit 60 (more specifically, in the casing 65).

The supporting member 63b is positioned upwardly of the UV irradiating unit 62 and outside the storage tank 61 as shown in FIG. 5. Therefore, the respective components of the moving mechanism 63 including the supporting member 63b as principal are not soaked in the waste liquid in the storage tank 61. Therefore, in the embodiment, the respective components of the moving mechanism 63 are prevented from being contaminated by the waste liquid.

The moving mechanism 63 configured as described above operates to maintain the distance between the UV irradiating unit 62 and the liquid level when the liquid level of the waste liquid is changed in terms of the vertical direction due to the change of the amount of the waste liquid in the storage tank 61. More specifically, the moving mechanism 63 in the embodiment operates to position the focal point of the lens 62b at a position corresponding to the liquid level in terms of the vertical direction. The operation of the moving mechanism 63 is controlled by the controller 100 via the unit control circuit 104 according to the change of a electric signal outputted by the liquid level sensor 64. The control of the moving mechanism 63 by the controller 100 will be described later in detail.

The liquid level sensor 64 is a sensor configured to detect the liquid level of the waste liquid in the storage tank 61 and output a electric signal according to the liquid level to the controller. The liquid level of the waste liquid is the liquid level of the waste liquid in the storage tank 61 and equivalent to the liquid level when the waste liquid is standstill (that is, the liquid level of the tank in the stationary state). The liquid level sensor 64 in the embodiment is an optical liquid level sensor configured to detect the liquid level on the basis of the reflection of light, and as shown in FIG. 5, includes a light-emitting element 64a, a light-receiving element 64b provided in parallel with the light-emitting element 64a, and an elongated rod 64c having a reflecting surface 64d at a distal end portion thereof. The optical liquid level sensor generally high in sensitivity, and has a high liquid resistant property since the fluorine resin or the like is used as a material of the rod 64c. Therefore, the liquid level sensor 64 in the embodiment is preferable as a sensor configured to detect the liquid level of the UV ink including excitable material. However, the liquid level sensor is not limited to the type as described above and, for example, the electrode-type liquid level sensor or a floating liquid level sensor may be employed.

The waste liquid treatment unit 60 configured as described above is controlled by the controller 100 via the unit control circuit 104 as shown in FIG. 1.

Control of Moving Mechanism 63

Figure 6A:
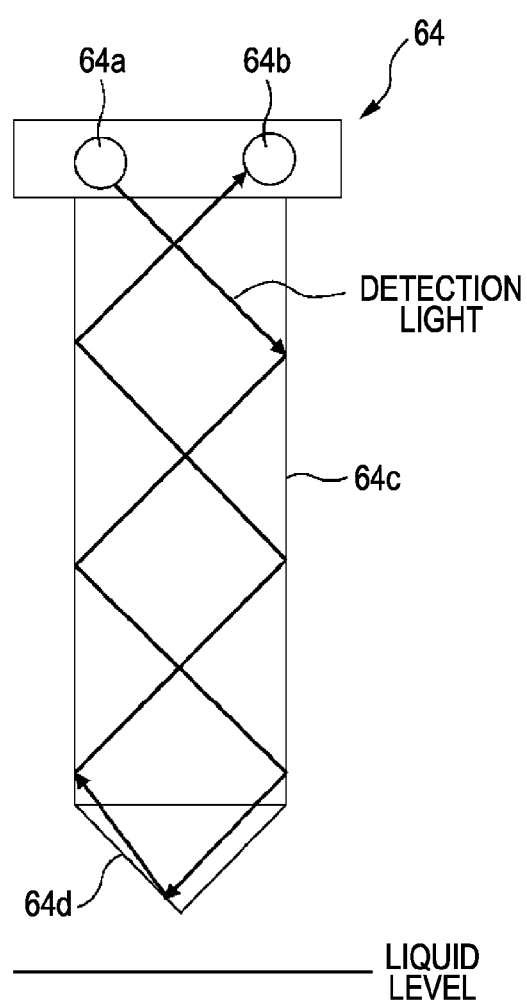
FIGS. 6A and 6B are explanatory drawings showing a liquid level detection by a liquid level sensor 64.
Figure 6B:
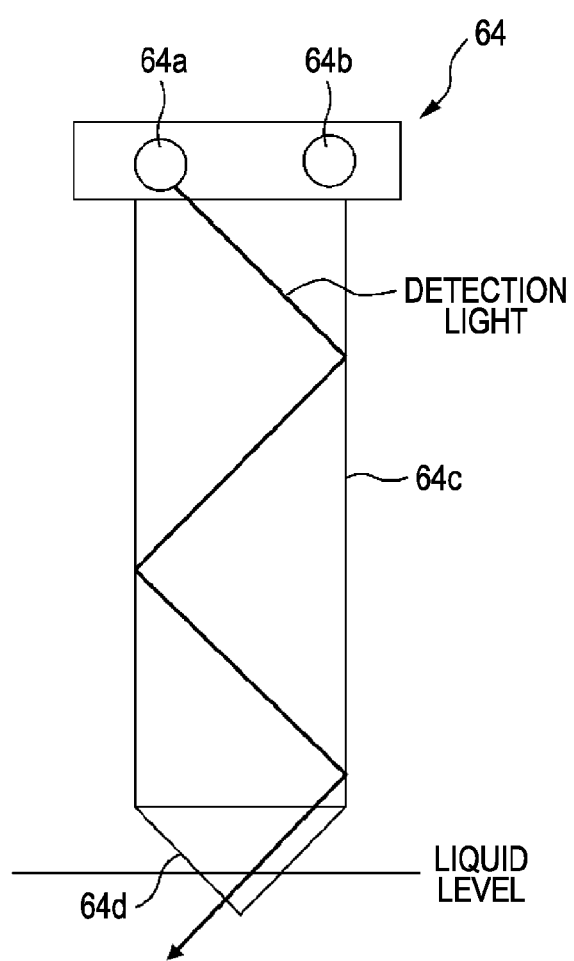

Control of the moving mechanism 63 by the controller 100 will be described below. Before describing the control, liquid level detection by the liquid level sensor 64 will now be described referring to FIGS. 6A and 6B. FIGS. 6A and 6B are explanatory drawings of the liquid level detection by the liquid level sensor 64.

The liquid level sensor 64 in the embodiment detects the liquid level by detecting the presence or absence of reflection of light emitted from the light-emitting element 64a and outputs an electric signal according to the liquid level as described above. More specifically, since the difference in index of refraction between the rod 64c and the air is large when the distal end portion of the rod 64c is in the air, the light (detection light) from the light-emitting element 64a is totally reflected from the reflecting surface 64d as shown in FIG. 6A. Consequently, the light-receiving element 64b receives the detection light and outputs a relatively large electric signal (liquid-absent signal). In contrast, when the distal end portion is in the liquid, the difference in index of refraction is small, and hence the detection light is discharged into the liquid through the reflecting surface 64d as shown in FIG. 6B. Consequently, the light-receiving element 64b does not receive the detection light, and outputs a relatively small electric signal (liquid-present signal). Therefore, the liquid level sensor 64 in the embodiment detects the liquid level by positioning the distal end portion of the rod 64c at a position about to reach the liquid level in terms of the vertical direction (that is, the position at which the liquid-present signal and the liquid-absent signal are switched).

In the embodiment, as shown in FIG. 5, the above-described liquid level sensor 64 is supported by the supporting member 63b via a second arm 63d. Therefore, the liquid level sensor 64 is allowed to move in terms of the vertical direction by the movement of the moving mechanism 63. Accordingly, even when the liquid level is changed in terms of the vertical direction by the change of the amount of waste liquid in the storage tank 61, detection of the liquid level after the change is achieved.

More specifically, when new waste liquid is fed to the storage tank 61 by the liquid feeding pump 51, whereby the amount of the waste liquid in the storage tank 61 is increased (that is, when the liquid level rises) in a state in which the distal end portion of the rod 64c is in the position about to reach the liquid level, the controller 100 controls the moving mechanism 63 and moves the liquid level sensor 64 upward. When the distal end portion of the rod 64c of the liquid level sensor 64 is about to reach the liquid level again, the electric signal from the liquid level sensor 64 is switched from the liquid-present signal to the liquid-absent signal. In other words, the liquid level sensor 64 detects the liquid level after the change of the level. Then, when the liquid level sensor 64 reaches the position to detect the liquid level (that is, when the liquid level sensor 64 is positioned at a point where the electric signal outputted from the liquid level sensor 64 is switched), the controller 100 stops the movement of the liquid level sensor 64 by the moving mechanism 63.

In contrast, when the amount of the waste liquid in the storage tank 61 is reduced by draining the waste liquid in the storage tank 61 or the like (that is, when the liquid level is lowered) in a state in which the distal end portion of the rod 64c is about to reach the liquid level, the controller 100 controls the moving mechanism 63 to move the liquid level sensor 64 downward. Then, by moving the liquid level sensor 64 downward until it reaches a position where the signal is switched from the liquid-absent signal to the liquid-present signal, the liquid level sensor 64 detects the liquid level after the change of the level.

With the control as described above, even when the liquid level is changed in terms of the vertical direction, the liquid level sensor 64 is allowed to stay at the detected liquid level continuously. In other words, the relative position (vertical relative position) of the liquid level sensor 64 with respect to the liquid level may be maintained continuously.

The contents described thus far will be described again from the viewpoint of the UV irradiating unit 62. The UV irradiating unit 62 is supported by the supporting member 63b of the moving mechanism 63 as described above. Therefore, the UV irradiating unit 62 and the liquid level sensor 64 supported by the supporting member 63b is moved upward and downward by the control of the moving mechanism 63 by the controller 100. At this time, the UV irradiating unit 62 is moved upward and downward while maintaining the relative position with respect to the liquid level sensor 64. The controller 100 stops the upward and downward movement of the UV irradiating unit 62 by the moving mechanism 63 when the electric signal outputted by the liquid level sensor 64 is switched (more specifically, when the signal is changed between the liquid-present signal and the liquid-absent signal).

With the control as described above, even when the liquid level is changed, the distance between the UV irradiating unit 62 and the liquid level is kept substantially constant. More specifically, the focal point of the lens 62b constantly positioned at the position corresponding to the liquid level in terms of the vertical direction while the waste liquid is stored in the storage tank 61. This is because the controller 100 controls the moving mechanism 63 in such a manner that the relative position of the liquid level sensor 64 with respect to the liquid level is always maintained while maintaining the relative position of the UV irradiating unit 62 with respect to the liquid level sensor 64. In this sense, the controller 100 may be said to be a member to control the moving mechanism 63 to cause the moving mechanism 63 to move the UV irradiating unit 62 upward and downward according to the change of the electric signal outputted from the liquid level sensor 64 for maintaining the distance between the UV irradiating unit 62 and the liquid level (more specifically, in order to cause the focal point of the lens 62b to be positioned at the position corresponding to the liquid level all the time). In this manner, the waste liquid treatment unit 60 in the embodiment is a device which is able to change the position of the focal point (the point of conversion of the ultraviolet ray) of the lens 62b in the vertical direction according to the change in the liquid level of the waste liquid in the storage tank 61.

The relative position of the UV irradiating unit 62 with respect to the liquid level sensor 64 is adjusted in advance so that the focal point of the lens 62b is positioned at the position corresponding to the liquid level when the upward and downward movement of the UV irradiating unit 62 by the moving mechanism 63 is stopped. In other words, the relative position is adjusted in such a manner that the focal point is positioned at the position corresponding to the liquid level when the liquid level sensor 64 reaches the position where the electric signal outputted from the liquid level sensor 64 is switched. The relative position is adjusted by adjusting the positions of the UV irradiating unit 62 and the liquid level sensor 64 viewed from the supporting member 63b (more specifically, the vertical lengths of the first arm 63a and a second arm 63d provided on the supporting member 63b).

Operation of Printer 10

Examples of operation of the printer 10 according to the embodiment with the configuration as described above will be described below.

Printing Operation

First of all, an operation of the printer 10 (printing operation) performed when printing an image on the medium S will be described. Upon reception of print data from the host computer 110 via an interface 101, the controller 100 controls the rotary drum 20, the head unit 30, and the fixing unit 40 via the unit control circuit 104. Upon control of the controller 100, the rotary drum 20 rotates, and the fixing unit 40 irradiates the peripheral surface 22 of the rotary drum 20 with the ultraviolet ray.

Then, the medium S supplied from a paper feed unit 72 is transported to the rotary drum 20, and is wound around the rotary drum 20, thereby being held on the peripheral surface 22 of the rotary drum 20. When the medium S rotates integrally with the rotary drum 20, the controller 100 controls the head unit 30 to eject UV ink toward the medium S from the nozzles of the respective heads 31. Consequently, the UV ink drops drop on the medium S (that is, the UV ink adheres to the medium S). By the rotation of the rotary drum 20, the UV ink drops drop on the medium S in sequence in the direction of rotation thereof. Therefore, dot lines formed of a plurality of the UV ink drops arranged along the direction of rotation are formed.

The UV ink drops dropped on the medium S move to positions opposing irradiating surfaces 41a of the lamp units 41 of the fixing unit 40 by the rotation of the rotary drum 20. Then, the UV ink drops are cured upon reception of the ultraviolet ray from the fixing unit 40. Consequently, the dot lines formed on the medium S is fixed to the medium S. As described above, the lamp units 41 are provided for the respective ink colors. Therefore, the UV ink drops in the respective colors receive the ultraviolet ray irradiated by the lamp units 41 corresponding to the colors of the UV ink drops.

By the further rotation of the rotary drum 20, the non-holding area 22a of the peripheral surface 22 of the rotary drum 20 arrives a position opposing to the nozzles, the controller 100 stops ejection of the ink from the nozzles, and moves the heads 31 in the direction of movement together with the head carriage 32. Then, the controller 100 performs the operation as described above. Consequently, the UV ink drops in a different color from the UV ink which is already dropped on the medium S and cured thereon are dropped thereon in registration. The controller 100 also moves the lamp units 41 in the direction of movement together with the lamp unit carriage 42 in association of the movement of the heads 31. Accordingly, the UV ink drops are continuously irradiated with the ultraviolet ray from the lamp units 41 corresponding to the color of the UV ink drops even after the movement of the heads 31.

Then, as a consequence of the repetition of the above-described series of operations by the controller 100, the dot lines in the respective colors are fixed to the entire area of the image forming area on the medium S. Consequently, an image is finally printed on the medium S. Then, the medium S formed with the image is separated from the rotary drum 20, and is transported to the paper discharging unit 74, and is ejected out of the printer 10 by the paper discharging unit 74.

Waste Liquid Treatment Operation

Figure 7:
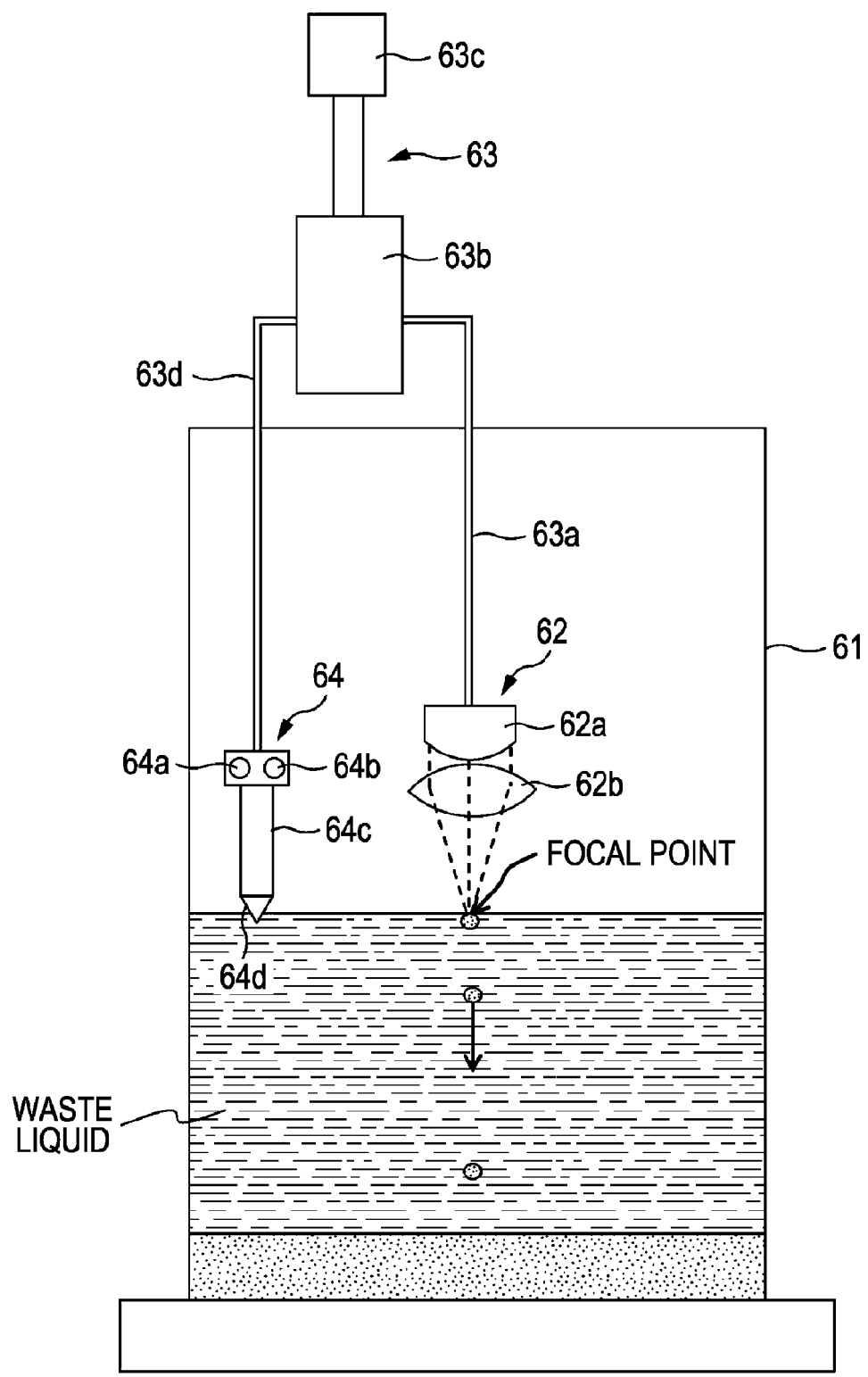
FIG. 7 is an explanatory drawing showing a waste liquid treatment operation.

Referring now to FIG. 7, a waste liquid treatment operation within the printer 10, that is, an operation by the waste liquid treatment unit 60 to collect waste liquid and cure the waste liquid will be described. FIG. 7 is an explanatory drawing showing the waste liquid treatment operation.

The waste liquid treated by the waste liquid treatment operation is, as described above, generated by the ejection of the UV ink from the nozzles for flashing. A flow of the flushing will be described. In a period when the UV ink is not ejected from the nozzles onto the medium S (that is, an idle period), the controller 100 moves the heads 31 in the direction of movement together with the head carriage 32 to bring the heads 31 to the waiting positions. Then, the controller 100 causes the cap unit 50 to seal the nozzle surfaces 31a of the heads 31 (see FIG. 5). The controller 100 then performs the flushing in the state in which the nozzle surfaces 31a of the heads 31 is sealed by the cap unit 50.

After having performed the flushing, the controller 100 activates the liquid feeding pump 51, and feeds the UV ink received in a recess 50a of the cap unit 50 to the waste liquid treatment unit 60 by the liquid feeding pump 51. The waste liquid treatment unit 60 stores the UV ink fed from the liquid feeding pump 51, that is, the waste liquid, to collect the waste liquid in the storage tank 61. Consequently, the liquid level of the waste liquid in the storage tank 61 is changed (rises).

Then, the controller 100 controls the moving mechanism 63 to move the liquid level sensor 64 upward to cause the liquid level sensor 64 to detect the liquid level of the waste liquid in the storage tank 61. Accordingly, the liquid level sensor 64 is moved upward until the position where the electric signal outputted from the liquid level sensor 64 is switched. Simultaneously, the moving mechanism 63 moves also the UV irradiating unit 62 upward to make the distance between the UV irradiating unit 62 and the liquid level a predetermined distance. More specifically, the UV irradiating unit 62 is moved upward to a position where the focal point of the lens 62b comes to the position corresponding to the liquid level.

The controller 100 stops the control of the moving mechanism 63 when the liquid level sensor 64 detects the liquid level (that is, when the focal point of the lens 62b of the UV irradiating unit 62 is positioned at the position corresponding to the liquid level). Then, the controller 100 controls the UV irradiating unit 62 (specifically, the light source 62a of the UV irradiating unit 62) to cause the UV irradiating unit 62 to irradiate with the ultraviolet ray. In other words, the UV irradiating unit 62 starts to irradiate the liquid surface of the waste liquid in the storage tank 61 in the uncured state with the ultraviolet ray. At this time, the UV irradiating unit 62 performs the spot irradiation with the ultraviolet ray in a state in which the focal point of the lens 62b is positioned at the position corresponding to the liquid level as shown in FIG. 7. In other words, when the UV irradiating unit 62 performs an irradiation with the ultraviolet ray, the lens 62b focuses ultraviolet ray emitted from the light source 62a to cause the ultraviolet ray to converge to the focal point of the lens 62b. Consequently, the UV irradiating unit 62 performs the spot irradiation with the ultraviolet ray so that the ultraviolet ray converges to the position corresponding to the liquid level as shown in FIG. 7. The term "spot irradiation" means an irradiation on a portion of the liquid surface intensively with the ultraviolet ray, and has an opposite concept from the term "whole-area irradiation", which means the irradiation of the whole area of the liquid surface with the ultraviolet ray.

Therefore, in the embodiment, portion of the liquid surface is intensively irradiated with the ultraviolet ray from the UV irradiating unit 62. In other words, the UV irradiating unit 62 in the embodiment performs the spot irradiation with the ultraviolet ray in such a manner that the surface area of a portion irradiated with the ultraviolet ray on the liquid surface in the storage tank 61 in the uncured state is smaller than the corresponding surface area of the liquid surface.

As described above, as a result of the spot irradiation with the ultraviolet ray by the UV irradiating unit 62, the waste liquid located at the position where the ultraviolet ray converges (more specifically, the waste liquid in the uncured state located at the position corresponding to the position of the focal point of the lens 62b) is selectively cured. In other words, while the waste liquid located at the position corresponding to the liquid level where the ultraviolet ray converges is intensively irradiated with the ultraviolet ray, the waste liquid located in the area other than the position where the ultraviolet ray converges at the liquid level is not irradiated with the ultraviolet ray. In other words, the amount of irradiation with the ultraviolet ray is the largest at the position of the waste liquid where the ultraviolet ray converges. Consequently, the corresponding waste liquid makes a transition quickly from the uncured state to the cured state.

Since the specific gravity of the waste liquid at a position where the ultraviolet ray converges is increased when it is cured than that in the uncured state, it is settled out on the bottom of the storage tank 61 after a while as shown in FIG. 7. As a result of settlement of the cured waste liquid (a portion of the waste liquid colored in gray in FIG. 7, and is referred to as "cured substance" hereinafter) in this manner, the waste liquid in the uncured state is located again at the position where the ultraviolet ray converges at the liquid level. Then, the waste liquid at the position where the ultraviolet ray converges is selectively cured again, and the cured substance is settled out on the bottom of the storage tank 61. By the repetition of such phenomenon, the cured substance is accumulated gradually on the bottom of the storage tank 61, and the accumulated amount increases with the elapse of ultraviolet ray irradiation time of the UV irradiating unit 62. In other words, the curing of the waste liquid in the storage tank 61 steadily progresses.

Figure 8:
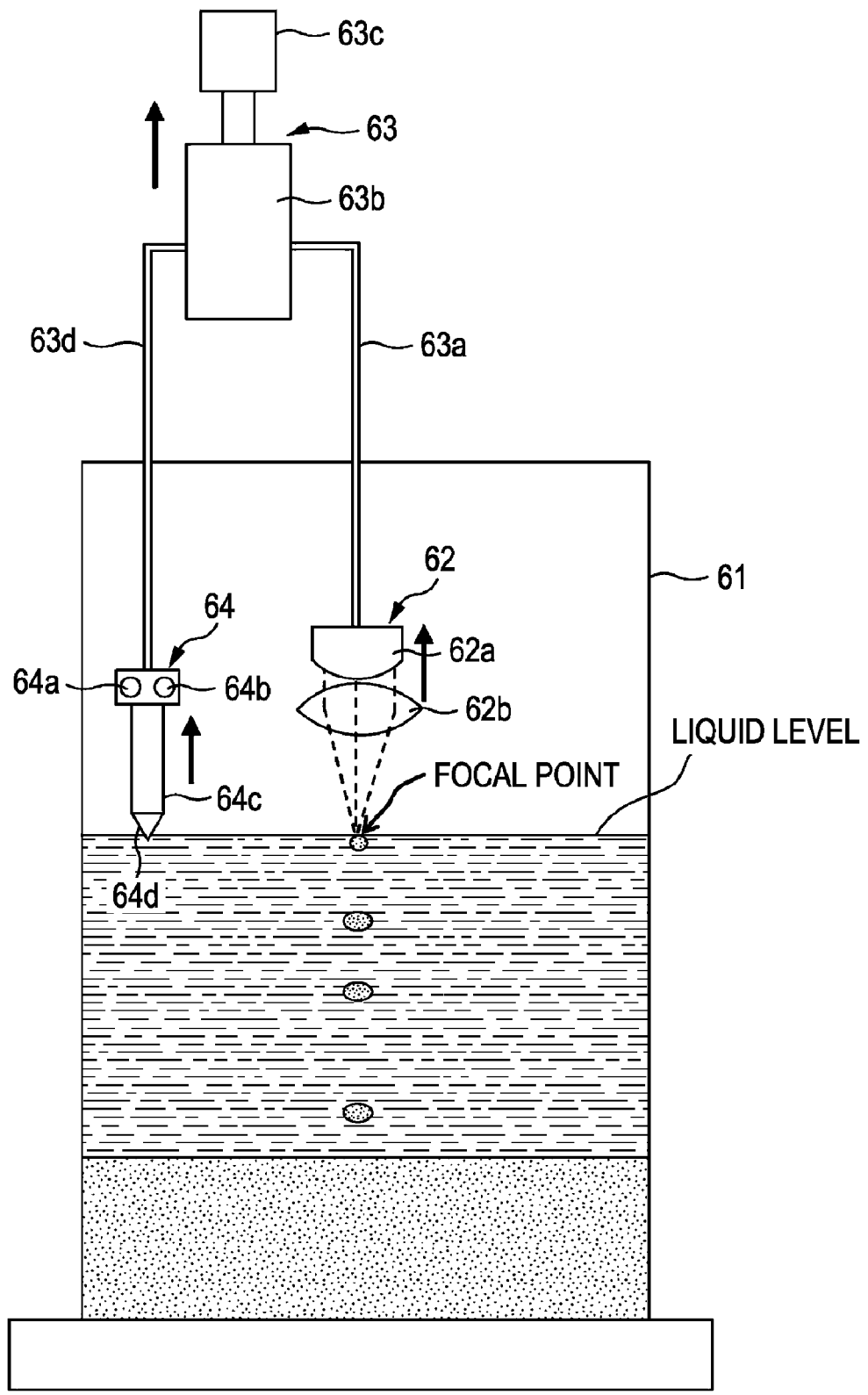
FIG. 8 is a drawing showing a case where the liquid level is changed.

When the amount of the waste liquid in the storage tank 61 is increased and hence the liquid level of the waste liquid further rises, the controller 100 controls the moving mechanism 63 to move the liquid level sensor 64 upward, and causes the liquid level sensor 64 to detect a new liquid level as described above. In association with it, the controller 100 moves the UV irradiating unit 62 upward so that the focal point of the lens 62b comes to a position corresponding to the new liquid level. Consequently, as shown in FIG. 8, the UV irradiating unit 62 performs the spot irradiation with the ultraviolet ray by focusing the ultraviolet ray on the position of the new liquid level. FIG. 8 is a drawing showing a case where the liquid level is changed and is a drawing corresponding to FIG. 7.

When the amount of the waste liquid in the storage tank 61 is reduced, and hence the liquid level of the waste liquid is lowered as well, the controller 100 controls the moving mechanism 63 to lower the UV irradiating unit 62 so that the focal point of the lens 62b comes to a position corresponding to the new liquid level. More specifically, for example, when the first flushing is performed after the state in which a significant amount of waste liquid exists in the storage tank 61 to a vacant state, the controller 100 moves the liquid level sensor 64 having the distal end portion thereof located above the liquid level downward to cause the liquid level sensor 64 to detect the liquid level. In association with it, the controller 100 moves the UV irradiating unit 62 downward so that the focal point of the lens 62b comes to a the position corresponding to the liquid level.

As described above, in the embodiment, the UV irradiating unit 62 continuously focuses the ultraviolet ray on the position corresponding to the liquid level even when the liquid level of the waste liquid is changed as well, so that the state in which the ultraviolet ray is able to cure the waste liquid at the position where the ultraviolet ray converges quickly is maintained.

Effectivity of Waste Liquid Treatment Unit 60 in the Embodiment

Figure 9:
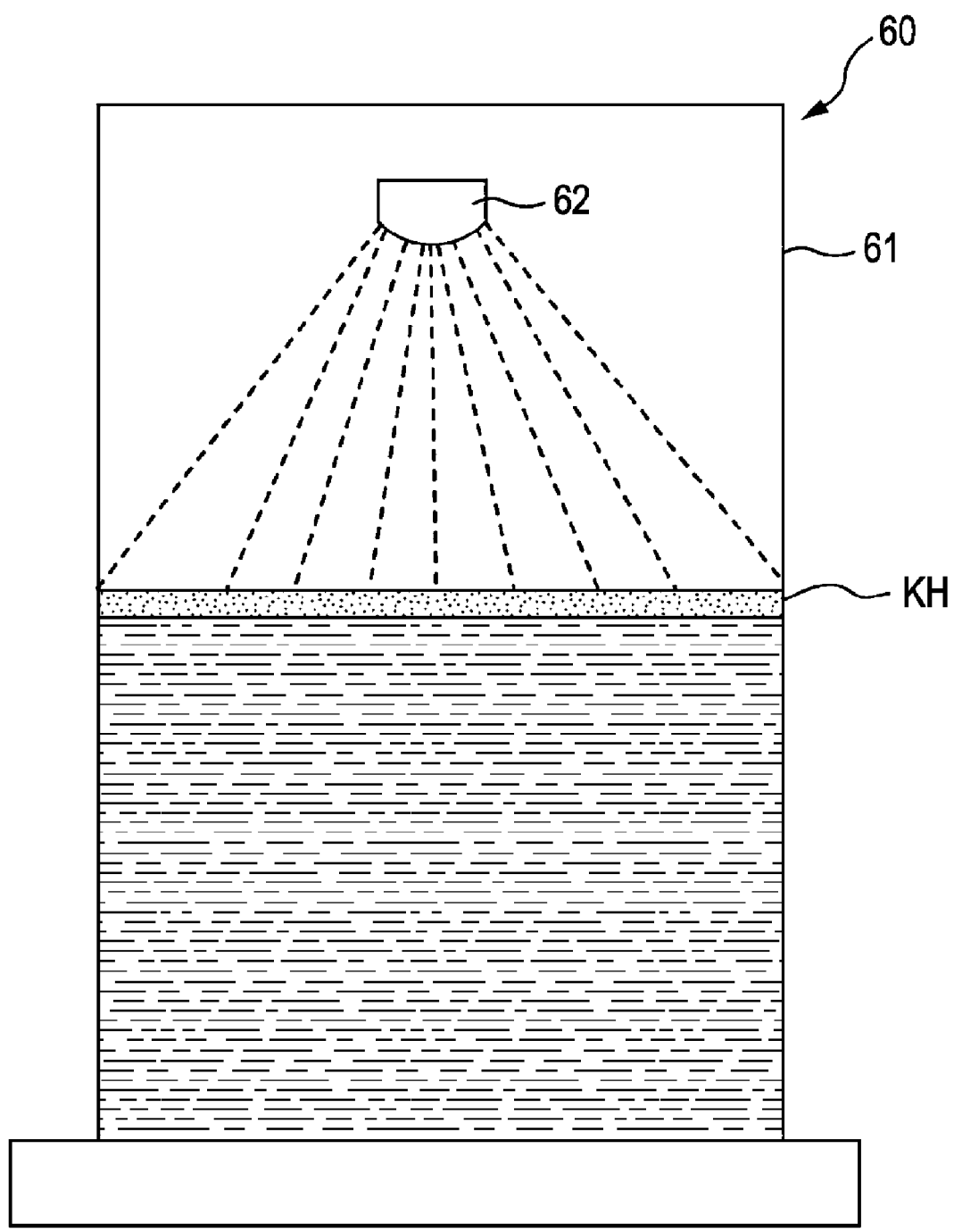
FIG. 9 is an explanatory drawing showing an effectivity of the waste liquid treatment unit 60.

In the embodiment, the waste liquid treatment unit 60 which includes the storage tank 61 configured to store the waste liquid which is cured upon reception of the ultraviolet ray and the UV irradiating unit 62 configured to irradiate the liquid surface of the waste liquid in the storage tank 61 in the uncured state with the ultraviolet ray, in which the UV irradiating unit 62 performs the spot irradiation of the ultraviolet ray so that the surface area of the liquid surface which is irradiated with the ultraviolet ray becomes smaller than the surface area of the liquid surface has been described thus far. Referring now to FIG. 9, the effectivity of the waste liquid treatment unit 60 in the embodiment will be described. FIG. 9 is an explanatory drawing for explaining the effectivity of the waste liquid treatment unit 60 in the embodiment and showing the waste liquid treatment unit 60 in the related art.

In the waste liquid treatment unit 60, as described in BACKGROUND, curing the waste liquid in the storage tank 61 in the uncured state as quickly as possible is required. However, with the waste liquid treatment unit 60 in the related art, the entire liquid surface of the waste liquid in the storage tank 61 in the uncured state is irradiated with the ultraviolet ray, so that the curing of the waste liquid in the uncured state is difficult.

More specifically, with the waste liquid treatment unit 60 in the related art as well, the liquid surface of the waste liquid in the storage tank 61 in the uncured state is irradiated with the ultraviolet ray, so that the cured substance of the waste liquid is formed at a position of the liquid level. However, with the waste liquid treatment unit 60 in the related art, since the UV irradiating unit 62 irradiates the entire liquid surface of the waste liquid with the ultraviolet ray as shown in FIG. 9, the cured substance grows until it covers the liquid surface and, finally, fixedly adheres to the inner wall surface of the storage tank 61. Consequently, a coating (shown by reference sign KH in FIG. 9) of the cured substance is formed on the surface of the waste liquid, and the coating KH fixedly adheres to the inner wall surface of the storage tank 61, so that it does not settle out on the bottom of the storage tank 61 and stays at the position corresponding to the liquid level as is. By the formation of the coating KH as described above, the ultraviolet ray from the UV irradiating unit 62 hardly reaches the waste liquid in the uncured state positioned below the coating KH, so that the curing of the waste liquid positioned below the coating KH is impaired.

As a result of dispersion of the ultraviolet ray from the UV irradiating unit 62 over the entire liquid surface, the amount of irradiation of the ultraviolet ray per unit surface area is relatively small in a portion of the liquid surface which is irradiated with the ultraviolet ray.

In contrast, the UV irradiating unit 62 in the embodiment performs the spot irradiation with the ultraviolet ray so that the surface area of the liquid surface which is irradiated with the ultraviolet ray becomes smaller than the surface area of the liquid surface. Therefore, the formation of the coating KH is prevented. In other words, since a portion of the liquid surface is intensively irradiated with the ultraviolet ray, the waste liquid is cured at the corresponding portion upon reception of the ultraviolet ray. Accordingly, the cured substance of the waste liquid does not grow until it extends over the entire liquid surface and hence fixedly adheres to the inner wall surface of the storage tank 61, and settles out to the bottom of the storage tank 61. Consequently, in the portion of the liquid surface which is irradiated with the ultraviolet ray, the cured substance of the waste liquid does not stay, and the waste liquid in the uncured state is continuously irradiated with the ultraviolet ray.

In addition, as a result of intensive irradiation with the ultraviolet ray from the UV irradiating unit 62 on a portion of the liquid surface, the amount of irradiation of the ultraviolet ray per unit surface area is relatively large in a portion of the liquid surface which is irradiated with the ultraviolet ray in comparison with the case of whole-area irradiation. Consequently, in the embodiment, the curing speed of the waste liquid located at a position which is irradiated with the ultraviolet ray is faster than the case of the whole-area irradiation.

As described above, in the waste liquid treatment unit 60 according to the embodiment, the above-described problems in the waste liquid treatment unit 60 in the related art are solved, and the waste liquid in the storage tank 61 in the uncured state is efficiently cured.

According to the embodiment, the UV irradiating unit 62 is configured to perform the spot irradiation with the ultraviolet ray so that the ultraviolet ray converges the position where the waste liquid is located in the storage tank 61. Accordingly, in comparison with a case where the position where the ultraviolet ray converges is different from the position of the waste liquid in the storage tank 61 (for example, when the focal point of the lens 62b is located outside the storage tank 61), the waste liquid in the storage tank 61 is irradiated with the ultraviolet ray further efficiently. In particular, in the case of the waste liquid located at the position where the ultraviolet ray converges, quick curing is achieved as a result of intensive irradiation with the ultraviolet ray. Consequently, efficient curing of the waste liquid in the uncured state is achieved.

In addition, in the embodiment, the UV irradiating unit 62 is configured to perform the spot irradiation with the ultraviolet ray so that the ultraviolet ray converges at the position corresponding to the liquid level in the storage tank 61. More specifically, the UV irradiating unit 62 performs the spot irradiation with the ultraviolet ray in a state in which the focal point of the lens 62b is positioned at the position corresponding to the liquid level. In such a case, maximum amount of irradiation with the ultraviolet ray per unit surface area is achieved in the portion of liquid surface which is irradiated with the ultraviolet ray. In other words, in the case in which the position where the ultraviolet ray converges corresponds to the position where the waste liquid is positioned in the storage tank 61, the more the position where the ultraviolet ray converges approaches the liquid level in terms of the vertical direction, the larger the amount of irradiation with the ultraviolet ray per unit surface area becomes. Accordingly, quicker curing of the waste liquid which receives the ultraviolet ray at the position corresponding to the liquid level is achieved. Consequently, further efficient curing of the waste liquid in the uncured state is achieved.

Other Embodiments

Although the waste liquid treatment unit 60 and the printer 10 having the waste liquid treatment unit 60 have been mainly described according to the embodiment shown above, the embodiment of the invention described above is intended for facilitating the understanding of the invention, and is not intended to limit the invention. The invention may be modified or improved without departing the scope of the invention, and the invention includes equivalents as a matter of course.

Figure 10:
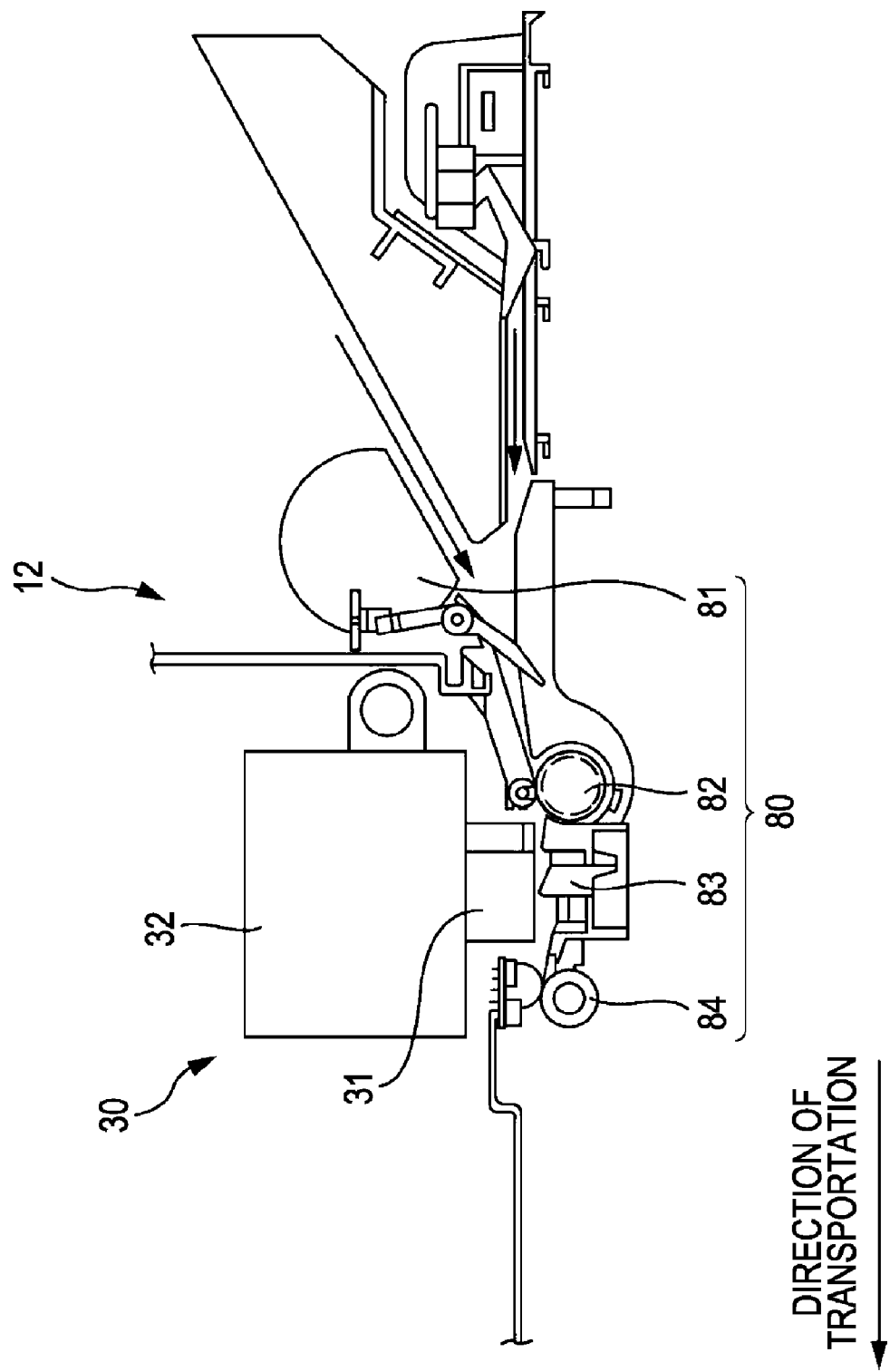
FIG. 10 is a schematic drawing showing a configuration of a printer 12 according to a first modification.

In the embodiment shown above, the printer 10 which prints an image on a media while holding the media on the peripheral surface 22 of the rotary drum 20 has been described. However, the invention is not limited thereto, and a mode different from the embodiment (first modification) is also applicable. Referring now to FIG. 10, a printer 12 according to a first modification will be described. FIG. 10 is a schematic drawing showing a configuration of the printer 12 according to the first modification, and in the drawing, the direction of transportation of the medium S is indicated by an arrow.

The printer 12 according to the first modification includes the head unit 30 having a single piece of the head 31, and a transporting unit 80 configured to transport the medium S in the direction of transportation as shown in FIG. 10. The transporting unit 80 includes a paper feed roller 81, a transporting roller 82, a platen 83 and the paper discharging roller 84. The medium S is fed by the paper feed roller 81 into the printer 12, and then is transported by the transporting roller 82 in the direction of transportation to a printable area. Then, the medium S is continuously transported in the direction of transportation while being supported by the platen 83, and is finally discharged by the paper discharging roller 84 out of the printer 12. In the first modification, the lower surface of the head 31 corresponds to the nozzle surface 31a and a plurality of nozzles arranged in lines along the direction of transportation are formed on the nozzle surface 31a for the respective ink colors. In the first modification, the controller 100 repeats an operation to cause the nozzle to eject the UV ink while moving the head 31 in the direction of movement to form dot lines extending along the direction of movement on the medium S and a transporting process to transport the medium S in the direction of transportation intersecting the direction of movement alternately. The invention is applicable also to the printer 12 according to the first modification.

In the embodiment described above, although the printer 10 having the heads 31 moving in the direction of movement for forming the dot lines (so-called, a serial printer) has been described, the invention is not limited thereto. For example, a printer having the head 31 which does not move and is arranged at a fixed position, and is able to form a plurality of dots arranged in the direction intersecting the direction of transportation of the medium S at once (so-called, a line printer) is also applicable.

The UV ink ejected from the nozzles for flushing is exemplified as the UV ink which does not adhere to the medium S in the embodiment described above. However, there is also the UV ink which does not adhere to the medium other than the UV ink ejected from the nozzles for flushing. For example, the UV ink in a mist state may be generated when ejecting the UV ink from the nozzle, and the UV ink in the mist state float in the printer 10 without adhering to the medium S. The waste liquid treatment unit 60 which collects the UV ink in the mist state as the waste liquid and cures the same is also applicable.

Although the UV irradiating unit 62 performs the spot irradiation with the ultraviolet ray by focusing the ultraviolet ray by the lens 62b in the embodiment, the ultraviolet ray may be focused by other ultraviolet ray focusing methods other than the lens 62b.

Although the ink jet printer which ejects the UV ink as an example of the liquid has been described in the embodiment, the invention is not limited thereto. The invention may be embodied in a liquid ejecting apparatus configured to eject liquid other than the ink (liquid other than ink which is cured upon reception of the ultraviolet ray, and liquid in which particles of functional material is dispersed also included). For example, a liquid ejecting apparatus configured to eject liquid including materials such as electrode material or color material used for manufacturing liquid crystal displays, EL (electroluminescence) displays, or surface-emission-type displays in a dispersed or dissolved state, a liquid ejecting apparatus which ejects liquid including biological organic substance used for manufacturing biochips, a liquid ejecting apparatus used as a precise pipette and configured to eject liquid as samples, a liquid ejecting apparatus configured to eject transparent resin liquid such as ultraviolet ray cured resin on a substrate for forming micro semispherical lenses (optical lenses) used for optical communication elements, and a liquid ejecting apparatus configured to eject etching solution such as acid or alkali for etching the substrate or the like are exemplified, and the invention may be applied to any one of these liquid ejecting apparatuses.

What is claimed is:

1. A waste liquid treatment device comprising:
   a storage unit configured to store waste liquid which is cured upon reception of an ultraviolet ray;
   an irradiating unit configured to irradiate a liquid surface of the waste liquid in the storage unit in an uncured state with an ultraviolet ray,
   wherein the irradiating unit performs a spot irradiation of the ultraviolet ray so that the surface area of the liquid surface which is irradiated with the ultraviolet ray is smaller than the surface area of the liquid surface, a moving mechanism configured to move the irradiating unit upward and downward; and a controller configured to control the moving mechanism, the irradiating unit including:

a light source of the ultraviolet ray; and a lens being positioned downwardly of the light source, the lens configured to focus the ultraviolet ray from the light source, the controller controls the moving mechanism so that a focal point of the lens is positioned at the position corresponding to the liquid surface.

2. The liquid discharging apparatus according to claim 1, wherein the storage unit is a storage tank, and the irradiating unit is positioned above the liquid level in the storage tank.

3. A liquid ejecting apparatus comprising:

a nozzle configured to eject liquid which is cured upon reception of a ultraviolet ray onto a medium;

a waste liquid treatment device having a storage unit configured to store the liquid ejected from the nozzle which does not adhere to the medium as waste liquid;

an irradiating unit configured to irradiate the liquid surface of the waste liquid in the storage unit in an uncured state with the ultraviolet ray;

wherein the irradiating unit performs a spot irradiation of the ultraviolet ray so that the surface area of the liquid surface which is irradiated with the ultraviolet ray is smaller than the surface area of the liquid surface, a moving mechanism configured to move the irradiating unit upward and downward; and a controller configured to control the moving mechanism, the irradiating unit including:

a light source of the ultraviolet ray; and a lens being positioned downwardly of the light source, the lens configured to focus the ultraviolet ray from the light source, the controller controls the moving mechanism so that a focal point of the lens is positioned at the position corresponding to the liquid surface.

4. The waste liquid treatment device according to claim 1, wherein the waste liquid treatment device includes a liquid level sensor configured to output a signal according to the liquid level of the liquid surface, the controller controls the moving mechanism according to the change of the signal outputted by the liquid level sensor and cause the moving mechanism to move the irradiating unit upward and downward in order to maintain the distance between the irradiating unit and the liquid level.

5. The liquid ejecting apparatus according to claim 4, wherein the liquid ejecting apparatus includes a liquid level sensor configured to output a signal according to the liquid level of the liquid surface, the controller controls the moving mechanism according to the change of the signal outputted by the liquid level sensor and cause the moving mechanism to move the irradiating unit upward and downward in order to maintain the distance between the irradiating unit and the liquid level.

* * * * *